US011881214B1

(12) United States Patent
Kadam et al.

(10) Patent No.: US 11,881,214 B1
(45) Date of Patent: Jan. 23, 2024

(54) SENDING PROMPT DATA RELATED TO CONTENT OUTPUT ON A VOICE-CONTROLLED DEVICE

(71) Applicant: Amazon Technologies, Inc., Seattle, WA (US)

(72) Inventors: Ashlesha Vishnu Kadam, Seattle, WA (US); Ian Michael Menzies, San Francisco, CA (US); Cristian Grub Rodriguez, Alvaro Obregon (MX); Suyash Parth, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 17/030,081

(22) Filed: Sep. 23, 2020

(51) Int. Cl.
| | | |
|---|---|---|
| *G10L 15/22* | (2006.01) | |
| *G06F 3/16* | (2006.01) | |
| *G10L 15/26* | (2006.01) | |
| *G10L 15/30* | (2013.01) | |
| *G06F 16/2457* | (2019.01) | |
| *G06F 16/68* | (2019.01) | |
| *G06F 16/635* | (2019.01) | |

(52) U.S. Cl.
CPC .......... *G10L 15/22* (2013.01); *G06F 3/16* (2013.01); *G06F 16/24578* (2019.01); *G06F 16/635* (2019.01); *G06F 16/686* (2019.01); *G10L 15/26* (2013.01); *G10L 15/30* (2013.01); *G10L 2015/223* (2013.01); *G10L 2015/227* (2013.01); *G10L 2015/228* (2013.01)

(58) Field of Classification Search
CPC ......... G10L 15/22; G10L 15/26; G10L 15/30; G10L 2015/223; G10L 2015/227; G10L 2015/228; G06F 3/16; G06F 16/24578; G06F 16/635; G06F 16/686
See application file for complete search history.

(56) References Cited

U.S. PATENT DOCUMENTS

| | | | |
|---|---|---|---|
| 10,959,059 B1 * | 3/2021 | Wyble .................. | H04W 4/06 |
| 11,301,513 B2 * | 4/2022 | McInerney ............ | G06N 5/045 |
| 2002/0180805 A1 * | 12/2002 | Chickering ............ | G06Q 10/02 |
| | | | 715/812 |

(Continued)

OTHER PUBLICATIONS

Lu, Li, et al. "Lip reading-based user authentication through acoustic sensing on smartphones." IEEE/ACM Transactions on Networking 27.1 (2019): 447-460 (Year: 2019).*

(Continued)

*Primary Examiner* — Jesse S Pullias
*Assistant Examiner* — Michael C. Lee
(74) *Attorney, Agent, or Firm* — Kilpatrick Townsend & Stockton LLP

(57) ABSTRACT

Techniques for sending prompt data related to content output on a voice-controlled device are described. In an example, a computer system receives request for audio output at a user device. The computer system determines a recommendation for content. The computer system also generates customization data for prompt data based on one or more user features, context features, metadata features, and a history of customization data. The prompt data includes the customization data and an acknowledgement associated with the request. The computer system sends the prompt data to the user device.

20 Claims, 10 Drawing Sheets

(56) References Cited

U.S. PATENT DOCUMENTS

| | | | | |
|---|---|---|---|---|
| 2014/0040729 | A1* | 2/2014 | Marlow | G06F 16/9535 |
| | | | | 715/240 |
| 2014/0095496 | A1* | 4/2014 | Xue | G06F 16/24578 |
| | | | | 707/732 |
| 2016/0132601 | A1* | 5/2016 | Nice | G06F 16/9535 |
| | | | | 707/754 |
| 2016/0188598 | A1* | 6/2016 | Moser | G06F 3/0482 |
| | | | | 707/723 |
| 2017/0330209 | A1* | 11/2017 | McGilliard | G06F 16/9535 |
| 2018/0090143 | A1* | 3/2018 | Saddler | G10L 13/02 |
| 2018/0150897 | A1* | 5/2018 | Wang | G06F 16/435 |
| 2018/0336894 | A1* | 11/2018 | Graham | G10L 15/22 |
| 2019/0035397 | A1* | 1/2019 | Reily | G06F 16/632 |
| 2019/0147880 | A1* | 5/2019 | Booker | G06F 3/167 |
| | | | | 704/251 |
| 2019/0155840 | A1* | 5/2019 | O'Konski | G06F 16/636 |
| 2021/0118442 | A1* | 4/2021 | Poddar | G06F 16/90332 |

OTHER PUBLICATIONS

McInerney, James, et al. "Explore, exploit, and explain: personalizing explainable recommendations with bandits." Proceedings of the 12th ACM conference on recommender systems. 2018, pp. 31-39 (Year: 2018).*

Kouki, Pigi, et al. "Personalized explanations for hybrid recommender systems." Proceedings of the 24th International Conference on Intelligent User Interfaces. 2019, pp. 379-390 (Year: 2019).*

Definition of "Weight" in Merriam-Webster dictionary, available at https://web.archive.org/web/20200725083615/https://www.merriam-webster.com/dictionary/weight (archived on Jul. 24, 2020) (Year: 2020).*

* cited by examiner

SENDING PROMPT DATA RELATED TO CONTENT OUTPUT ON A VOICE-CONTROLLED DEVICE

BACKGROUND

As voice recognition technology improves, systems that employ such technology continue to proliferate. Some systems employ what is referred to as near-field voice recognition where a user speaks into a microphone located on a hand held device, such as a remote control or mobile device. Other systems employ far-field voice recognition where a user can speak to a device while the user is within the general vicinity of the device, e.g., within the same room, but not necessarily in close proximity to or even facing the device. Both far-field devices and near-field devices can be used for audio and video playback.

BRIEF DESCRIPTION OF THE DRAWINGS

Various embodiments in accordance with the present disclosure will be described with reference to the drawings, in which.

DETAILED DESCRIPTION

Figure 1:
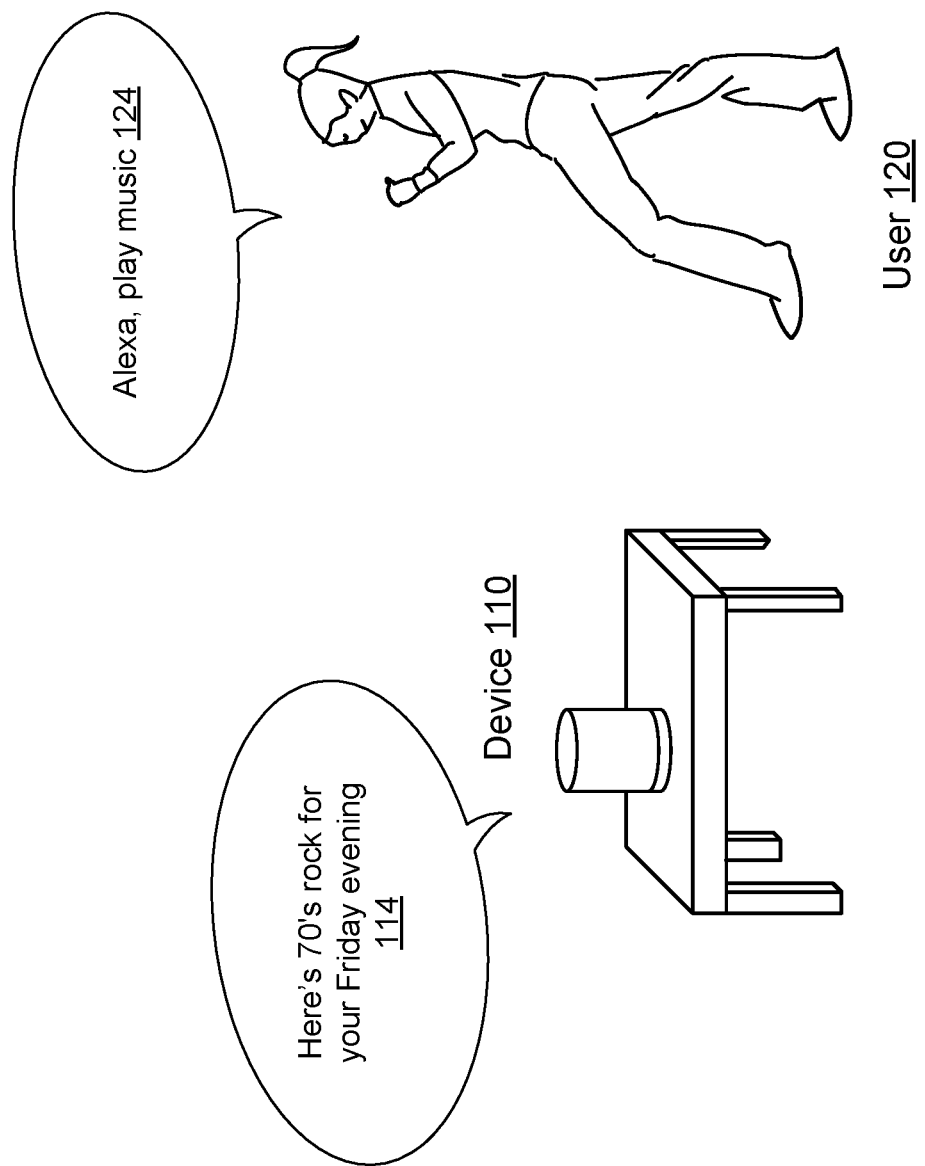
FIG. 1 illustrates an example of prompt data related to content output on a device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, generating and sending dynamic prompts related to content output. In an example, a computer system receives a request for content output from a user device, such as a from a voice-controlled device. The request includes speech-to-text data generated based on speech input at the user device. The computer system determines a recommendation for content from a data store based on, for instance, the speech-to-text data, a user account associated with the user device, and context associated with the request. The user account includes user features such as a history of user requests, user preferences, and content affinities, and the like. The context can include multiple context features, such as time of day, date, location of the user device, device type, language of the speech input, data about an ongoing dialogue session, and the like. The computer system also determines metadata associated with the content, where this metadata includes multiple metadata features such as the content's genre, author, era, release date. For some or each of the user features, context features, and metadata features, the computer system determines a weight. In an example, a weight of a feature can depend on the feature's relevance to the recommendation. Depending on the weights and a history of customization data that is associated with the user account and that is used in previous prompt data, the computer system generates customization data that is associated with the current request and that includes at least one of the user features, the context features, or the metadata features. The computer system also generates prompt data that includes an acknowledgement of the speech input and the customization data. The prompt data is sent to the user device and the user device outputs the prompt data prior to outputting the music content. In this way, a user receives insight about why the content was chosen for output, where this reason is customized according to the user account, context, and/or metadata.

To illustrate, consider an example of a smart speaker that responds to a specific wake word (e.g., "Alexa"). A user can provide a natural language utterance for music playback (e.g., "play music") while in the vicinity of the smart speaker. A microphone of the smart speaker detects the speech input and a processor of the smart speaker detect the wake word therefrom. In response, the smart speaker outputs music content suitable to the user. To do so, the smart speaker sends a request to a computer system, such one implementing a cloud computing service. The request can include at least a portion of the detected audio (e.g., "play music"). The computer system generates and processes speech-to-text data from the detected audio and inputs, to a recommendation engine, this data along with a user preference and a time of day (e.g., evening) among other features. The recommendation engine indicates that a "seventies rock playlist" is recommended content. The computer system determines a genre of the recommended playlist (e.g., rock). Based on weights associated with the user preference, the time of day, and the genre and used by the recommendation engine, the computer determines that the user's preference weight is larger than that of the time of day that, in turn, is larger than that of the genre. From a history of customization data, the computer system determines that only user preference was recently used in a previous prompt. Accordingly, the computer system selects and includes the time of day in the prompt, but not the user preference or the genre. Upon receiving the prompt data, the smart speaker outputs on its speakers a prompt of "here is seventies rock playlist suitable for this evening" and the starts streaming the music playlist.

Embodiments of the present disclosure provide various technological advantages over a conventional computer system that provides content. For example, the conventional computer system can generate and output prompt data for content requests. However, this prompt data does not include customization data regarding why the selected content was chosen. In this way, users have not known why they have received certain results (e.g., in response to "play music," the user may merely hear "here is a seventies playlist"). Users may make repeated requests for content if they do not understand why the selected content was chosen. In comparison, the embodiments customize the prompt such that the reason is not only explained, but the explanation is also customized to the user account, context, or metadata (e.g., in response to "play music," the user may hear "here is a seventies rock playlist suitable for this evening"). Because a customized reason is output, users may no longer have to make repeated requests. Accordingly, the amount of speech input received by the user device is reduced. As a result, the amount of processing at the user device and the computer system and the amount of data exchange and network use between the user device and the computer system are reduced.

FIG. 1 illustrates an example of a device 110 outputting a content-related prompt, according to embodiments of the present disclosure. As illustrated, the device 110 may be located in a room and be operable by a user 120. Upon detection of speech input, the device 110 processes the speech input and outputs a prompt as a response. The prompt is customized based on the speech input and previous prompts output by the device 110. As further illustrated in the next figures, the processing and customization can be performed, at least in part, in connection with a computer system, such as a backend server or a cloud computing service.

In an example, the device 110 represents a computing device that is capable of supporting various computing services including, for instance, audio processing operations. In particular, the device 110 includes one or more audio processing systems, one or more network interfaces, one or more microphones, one or more speakers, and/or other computing components. Audio can be detected by a microphone and can be processed by a computer system to determine content to be output by the device 110. In an illustration, the device 110 can be any of a smart speaker, a multimedia device, a smart home device, a tablet, a mobile device, an Internet of Things (IoT) device, or any other type of suitable computing device.

In the illustration of FIG. 1, the device 110 is a smart speaker responsive to a wake word (e.g., "Alexa") and can be controlled by the user 120 based on speech input 124 of the user 120. For instance, upon an utterance that includes the wake word and a command (e.g., "Alexa, play music"), the device 110 detects the wake word and performs the command (e.g., determines and outputs music content). The device 110 outputs a prompt 114 (e.g., shown as "here's seventies rock for your Friday evening") acknowledging the speech input 124 and including a customization for the prompt 114 prior to outputting the music content.

To generate prompt data for the prompt 114, the device 110 sends a request to a computer system, such as one implementing a cloud computing service. The request can include at least a portion of the detected speech input 124 (e.g., "play music"). The computer system generates and processes speech-to-text data from the detected audio. This data along with a user preference and a time of day (e.g., evening) among other features are used by the computer system to determine recommended content. The computer system indicates that a "seventies rock playlist" is recommended content. The computer system determines a genre of the recommended playlist (e.g., rock). Based on weights associated with preferences of the user 120, the time of day, and the genre used by the computer system, the computer system determines that the user's preference weight is larger than that of the time of day that, in turn, is larger than that of the genre. From a history of customization data, the computer system determines that only user preference was recently used in a previous prompt. Accordingly, the computer system selects and includes the time of day and genre in the prompt, but not the user preference. Upon receiving the prompt data, the device 110 outputs on its speakers the prompt 114 of "here is a seventies rock playlist for your Friday evening" and then starts streaming the music playlist.

Prompt data generation for music content is one example use case. Embodiments of the present disclosure are not limited to this use case and similarly apply to other audio processing operations. For example, prompt data related to content output can be generated for other types of content such as recipes, podcasts, products, and movies (e.g., in response to "Alexa, please give me a recipe recommendation," the device 110 may output "here is a Thai recipe that is vegetarian and that uses ingredients from your last online purchase" in response to determining that the user has a good affinity to Thai food and their user account indicates that they have recently purchased the necessary ingredients).

Figure 2:
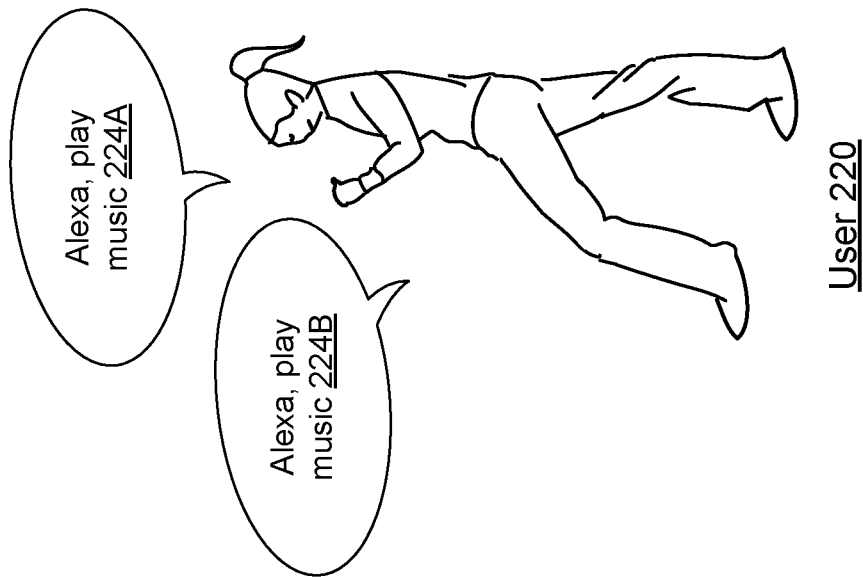
FIG. 2 illustrates an example of a device outputting prompt data for multiple speech inputs according to embodiments of the present disclosure.
Figure 2:
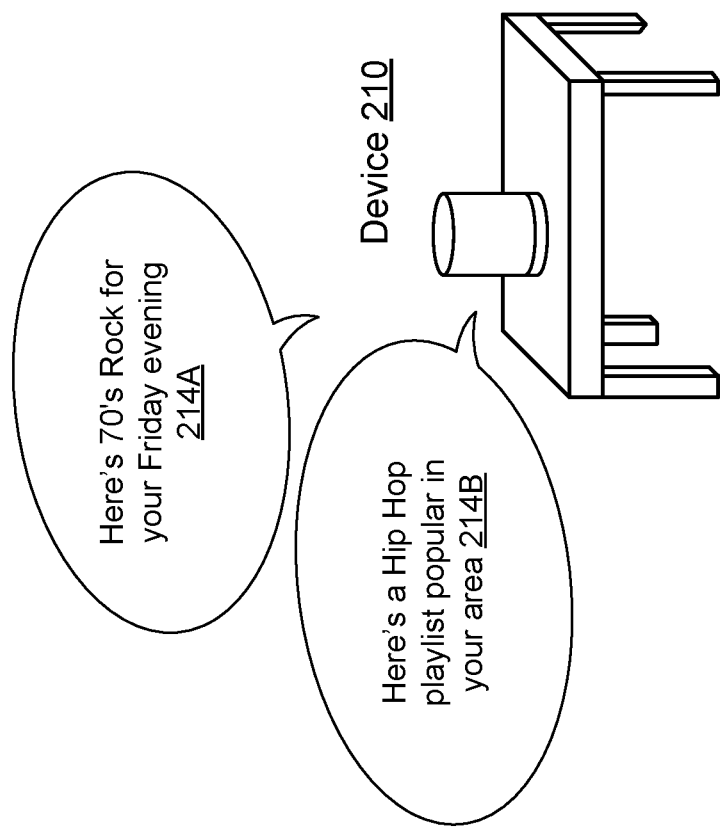

FIG. 2 illustrates an example of a device 210 outputting prompts for multiple speech inputs according to embodiments of the present disclosure. The device 210 is an example of the device 110 of FIG. 1. During a session (e.g., a period of time that starts and/or is renewed with a user request and extends for a predefined time length), a user, such as user 220, may repeat the same or similar speech inputs. A computer system associated with the device 210 can recognize the speech inputs to be the same based on natural language learning. The output of the device 210 can be customized differently for each speech input.

In an example, the device 210 receives a first speech input (e.g., shown as "Alexa, play music") 224A from the user 220. The device 210, in communication with the computer system, processes the first speech input 224A and outputs a first prompt 214A (e.g., shown as "here's seventies rock for your Friday evening"). The first prompt 214 includes a first set of features associated with the user 220, a context of the device 210 or the first speech input 224A, metadata associated with recommended content, or any combination of these. For example, the first prompt 214A includes context features of a time of day and a date (e.g., "Friday evening").

During a same session (another user request is received before expiration of the period of time, such as thirty minutes), the device 210 receives a second speech input 224B that is the same as or similar to the first speech input 224A. The device 210 processes the second speech input 224B and outputs a second prompt 214B (e.g., shown as "here's a hip hop playlist popular in your area"). Although the two speech inputs 224A and 224B are the same (or similar, where they can be determined to correspond to a same intent), the corresponding prompts 221A and 224B are customized differently. For instance, the second prompt 214B includes a second and different set of features associated with the user 220, the context of the device 210 or the second speech input 224B, metadata associated with recommended content, or any combination of these. For example, the second prompt 214B includes a context feature of a location of the device 210 (e.g., "popular in your area").

The second prompt 214B may also be generated based on a history of customization data. For example, customization data included in the first prompt 214A can be stored in the history. When the second prompt 214B is generated, the history can be considered. The history may be considered for the current session or over a predefined number of previous sessions. To illustrate, the history may include customization data indicating features of the time and date were included in the first prompt 214A. As a result, time and date features can be excluded from the second prompt 214B.

Figure 3:
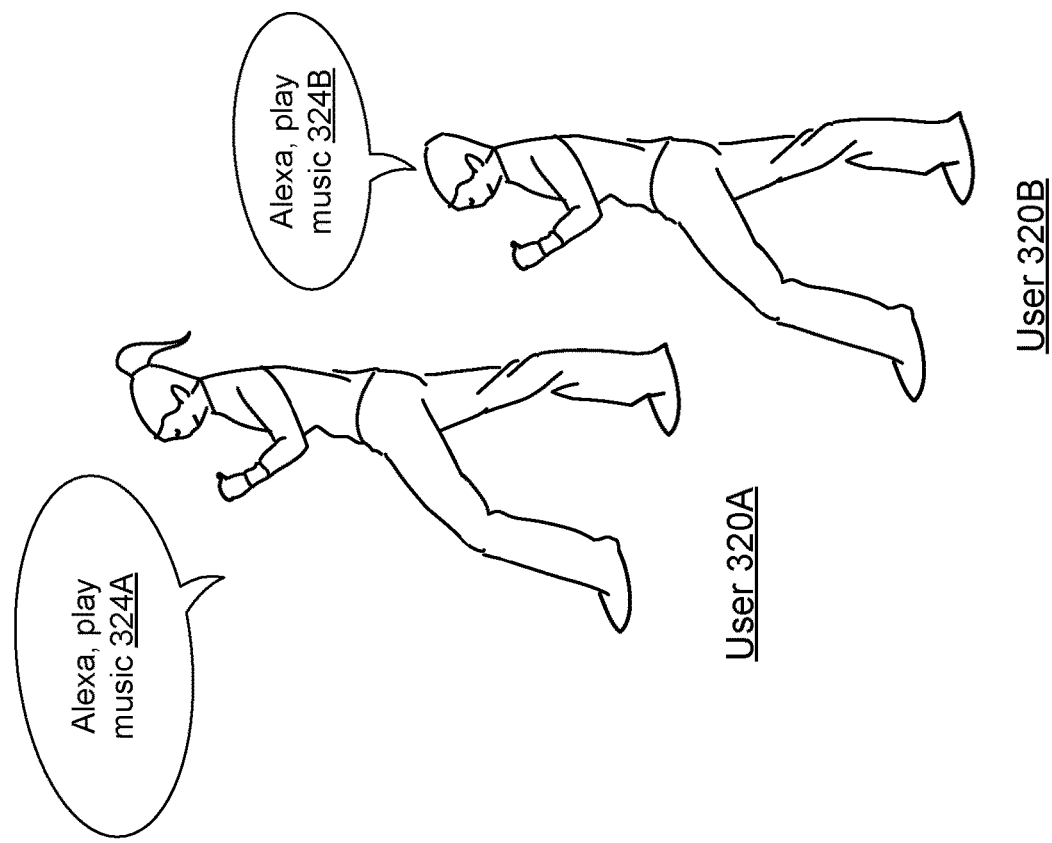
FIG. 3 illustrates an example of a device outputting prompt data for speech inputs from multiple users, according to embodiments of the present disclosure.
Figure 3:
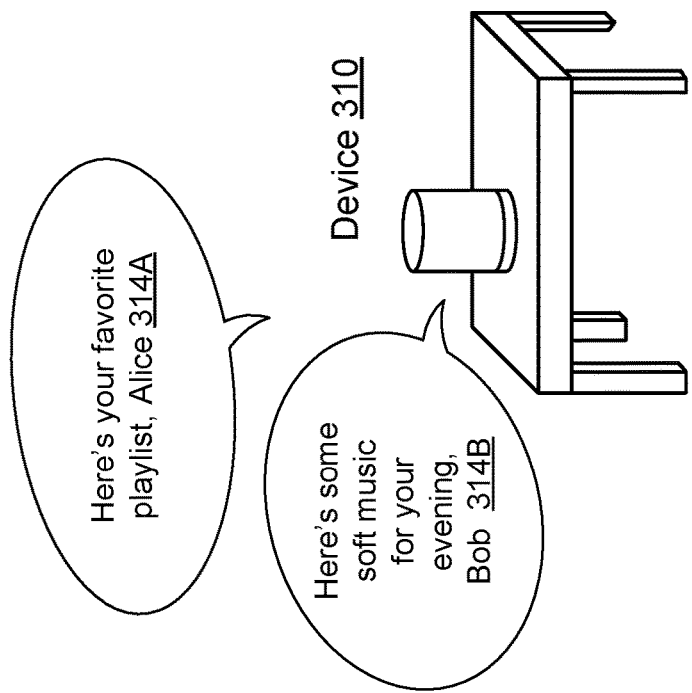

FIG. 3 illustrates an example of a device 310 outputting prompt data for speech inputs from multiple users, according to embodiments of the present disclosure. The device 310 may be associated with multiple users and is an example of the device 110 of FIG. 1. Each user can have a user account associated with the device. A computer system associated with the device 310 can recognize the different users. The output of the device 310 can be customized differently for each user based on their user account.

In an example, the device 310 receives a first speech input (e.g., shown as "Alexa, play music") 324A from a first user 320A. The computer system, in communication with the device 310, processes the first speech input 324A and determines the first speech input 324A includes a user identifier (e.g., voiceprint) associated with the first user 320A. Based on prompt data from the computer system, the device 310 outputs a first prompt 314A (e.g., shown as "here's your favorite playlist, Alice"). The first prompt 314A includes a set of features associated with the first user 320A, a context of the device 310 or the first speech input 324A, metadata associated with recommended content, or any combination of these. For example, the first prompt 314A includes a user feature of user affinities ("e.g., your favorite playlist").

At another point in time (e.g., during a same session or a different session), the device 310 receives a second speech input 324B from a second user 320B. The computer system processes the second speech input 324B and determines the second speech input 324B includes a user identifier (e.g., voiceprint) associated with the second user 320B. The device 310 outputs a second prompt 314B (e.g., shown as "Here's some soft music for your evening, Bob"). The second prompt 314B includes a set of features associated with the user 320, the context of the device 310 or the second speech input 324B, metadata associated with recommended content, or any combination of these. For example, the second prompt 314B includes a user feature of a user affinity (e.g., "soft music") and a context feature of a time of day (e.g., "evening").

While user identifiers, such as voiceprints, are described herein, any information relating to users and user accounts are acquired observing privacy requirements. Additionally, the use of such user information observes applicable requirements, whereby a user has control about whether such identifiers can be used about retention of such identifiers at the computer system.

Figure 4:
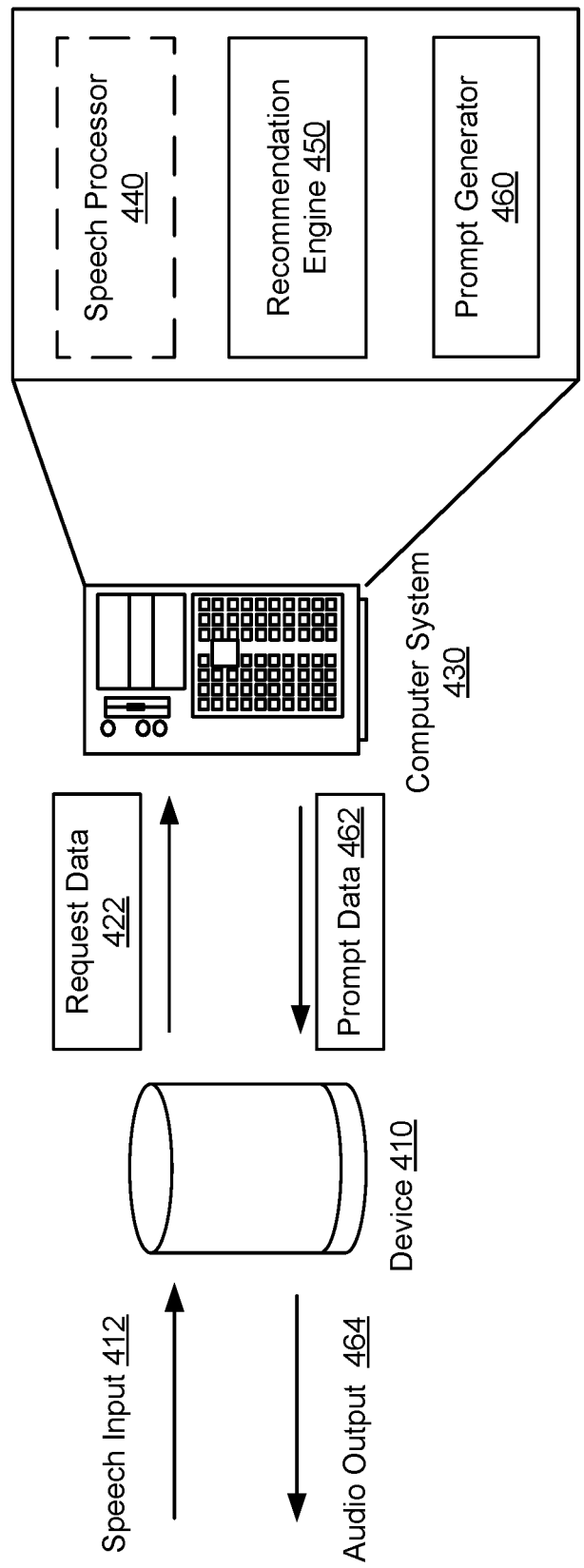
FIG. 4 illustrates an example of components of a system for generating and outputting a content-related prompt, according to embodiments of the present disclosure.

FIG. 4 illustrates an example of components of a system for generating and outputting a content-related prompt, according to embodiments of the present disclosure. The system includes a device 410, which is an example of device 110 in FIG. 1. The device 410 can include multiple input and output modalities. For example, the device 410 can receive speech input and/or a different type input (e.g., text input, a graphical user interface (GUI) input, gesture input, etc.). Additionally, the device 410 may output audio and/or other type output (e.g., text output, video output, graphical output, etc.). The system also includes a computer system 430 that is capable of supporting various computing services including, for instance, prompt generation operations. In particular, the computer system 430 includes one or more processors, one or more memories storing computer-readable instructions, one or more network interfaces, and/or other computing components.

In an example, the device 410 receives speech input 412. A microphone of the device 410 receives the speech input 412. The speech input 412 is from a user and may include a wake word (e.g., "Alexa") associated with the device 410. The speech input 412 also includes a command (e.g., "play music").

In an example, the device 410 transmits request data 422 to the computer system 430. The device 410 may support a number of audio-processing operations including, for instance, sound detection, automatic speech recognition (ASR), voice over internet protocol (VOIP) processing, playback, and the like. The device 410 can process the speech input 412 to generate speech-to-text data based on the speech input 412. The speech-to-text data can correspond to the request data 422. Alternatively, the request data 422 may be audio data including at least part of the speech input 412.

In an example, the computer system 430 receives the request data at a speech processor 440. The speech processor 440 may alternatively be a component of the device 410. The speech processor 440 performs audio processing operations such as ASR and natural language recognition to generate speech-to-text data, as needed (e.g., if audio data is received) and an understanding of this data (e.g., the intent such as the command of "playback operation," and the tokens or values such as "music"). As applicable (e.g., in the case of multiple users, where such users have authorizes so), the speech processor 440 also determines a user identifier (e.g., voiceprint) associated with the speech input 412 to determine the user providing the speech input 412. The computer system 430 accesses a user account associated with the user to determine user features. Generally, a user feature can be an attribute, property, or data relevant to the user and usable to determine a relevant response to the speech input. For example, user features include any of a history of requests, a user preference, or content affinities.

In an example, a recommendation engine 450 of the computer system 430 receives the request data 422, at least one user feature associated with the user, and at least one context feature associated with context of the request. Generally, a context feature can be an attribute, property, or data relevant to the context of the request and usable to determine a relevant response to the speech input. The context feature can include any of a time of day, a date, a location of the user device, a device type, a language of the speech input 412, or a session. The recommendation engine 450 determines a recommendation for content based on the request data 422, the user account, and the context. For example, if the computer system 430 determines the request is for music content, the recommendation engine can determine a recommendation from a data store. The recommendation engine also determines weights for the features. For example, the recommendation engine 450 determines a first weight associated with the user feature, a second weight associated with the context feature, and a third weight associated with a metadata feature. For music content, the metadata feature can include any of an artist, era, genre, or release data for the music content. Generally, a metadata feature can be an attribute, property, or data relevant to content (e.g., music) and available from metadata that is usable to determine a relevant response to the speech input. The recommendation engine 450 uses the weights to generate the recommendation. The recommendation engine 450 transmits the recommendation and the weights to a prompt generator 460 of the computer system 430.

In an example, the prompt generator 460 receives the recommendation, the weights, the user feature, the context feature, and the metadata feature. The prompt generator 460 generates customization data based on the features, weights, and a history of customization data. The prompt generator 460 may compare the weights of the user feature and the context feature to determine what to include in the customization data. For example, the prompt generator 460 can determine the weight of the user feature is larger than the weight of the context feature. As a result, the prompt generator 460 can include the user feature in the customization data. The prompt generator 460 may additionally consider the history of customization data. For example, the prompt generator 460 can determine that although the weight associated with the user feature is larger than the context feature, the user feature was used in previous customization data and the previous customization data excluded the context feature. As a result, the prompt generator 460 includes the context feature instead of the user feature in the customization data.

In another example, the prompt generator 460 receives both the recommendation and another recommendation for the content based on the request, the user account, and the context. The recommendation may correspond to a top recommendation determined by the recommendation engine 450, and the other recommendation may correspond to a second recommendation determined by the recommendation engine 450. The recommendation was generated based on a first set of features (e.g., user features, context features), and the other recommendation was generated based on a second set of features. The prompt generator 460 compares the first set of features and the second set of features to determine features included in the first set and excluded from the second set. The prompt generator 460 includes the features in the first set that are excluded from the second set in the customization data. For example, the prompt generator 460 can determine a user preference was included in the first set and excluded from the second set. As a result, the prompt generator 460 includes the user preference in the customization data. As described herein above, the selection of this user preference can also be subject to the history of customization data (e.g., the user preference is selected if it has not been recently used).

In an example, the prompt generator 460 determines a customization rule that limits a total number of features that can be included in the customization data. As a result, the prompt generator 460 includes the user feature, context feature, or metadata feature in the customization data based at least in part on the customization rule. For example, the customization rule may limit the total number of features that can be included in the customization data to two. The prompt generator 460 can determine to include the user feature and metadata feature and not the context feature in the customization data based on the customization rule (and, as described herein above, based on weights, history of customizations, and/or differences between recommendations of the recommendation engine 450).

In another example of the prompt generator 460 using a customization rule to generate the customization data, the prompt generator can determine the customization rule limits a re-use of a feature from previous prompt data. The prompt generator 460 can determine the previous prompt data excludes one or more of the user feature, the context feature, or the metadata feature and include those one or more features in the customization data.

In another example of the prompt generator 460 using a customization rule to generate the customization data, the prompt generator can determine the customization rule allows multiple features of the same type to be included in the prompt data 462. The prompt generator 460 can determine include multiple context features, user features, or metadata features in the prompt data 462 based on the customization rule.

In an example, the computer system 430 transmits prompt data 462 to the device 410. The prompt data 462 includes an acknowledgement of the speech input 412 and the determined customization data. The prompt data 462 may be transmitted as text data or audio data. The device 410 outputs the prompt data 462 as audio output 464. In some examples, the device 410 includes a graphical user interface (GUI) and additionally outputs a visual output.

To illustrate, the device 410 receives speech input 412 of a user saying "Alexa, play music". The device 410 transmits speech-to-text data as the request data 422 to the computer system 430. The computer system 430 processes the request data 422 to determine a response should include music content. The computer system 430 also determines the user account associated with the user. Additionally, the computer system 430 determines it is morning. The recommendation engine 450 receives the request data 422, user features, such as a music content affinity of country music of the user, and the context that it is morning. Based on the request data 422 and the features, the recommendation engine 450 determines a music content recommendation of a country music playlist from a data store. The prompt generator 460 receives the recommendation, the features, and weights associated with the features. The prompt generator 460 determines previous prompt data included the user feature and excluded the context feature. As a result, the prompt generator 460 includes the context feature in the prompt data 462. The device 410 receives the prompt data 462 and outputs audio output 464. The audio output 464 is "here is some soft country for your morning," based on the recommendation and the context feature.

Figure 5:
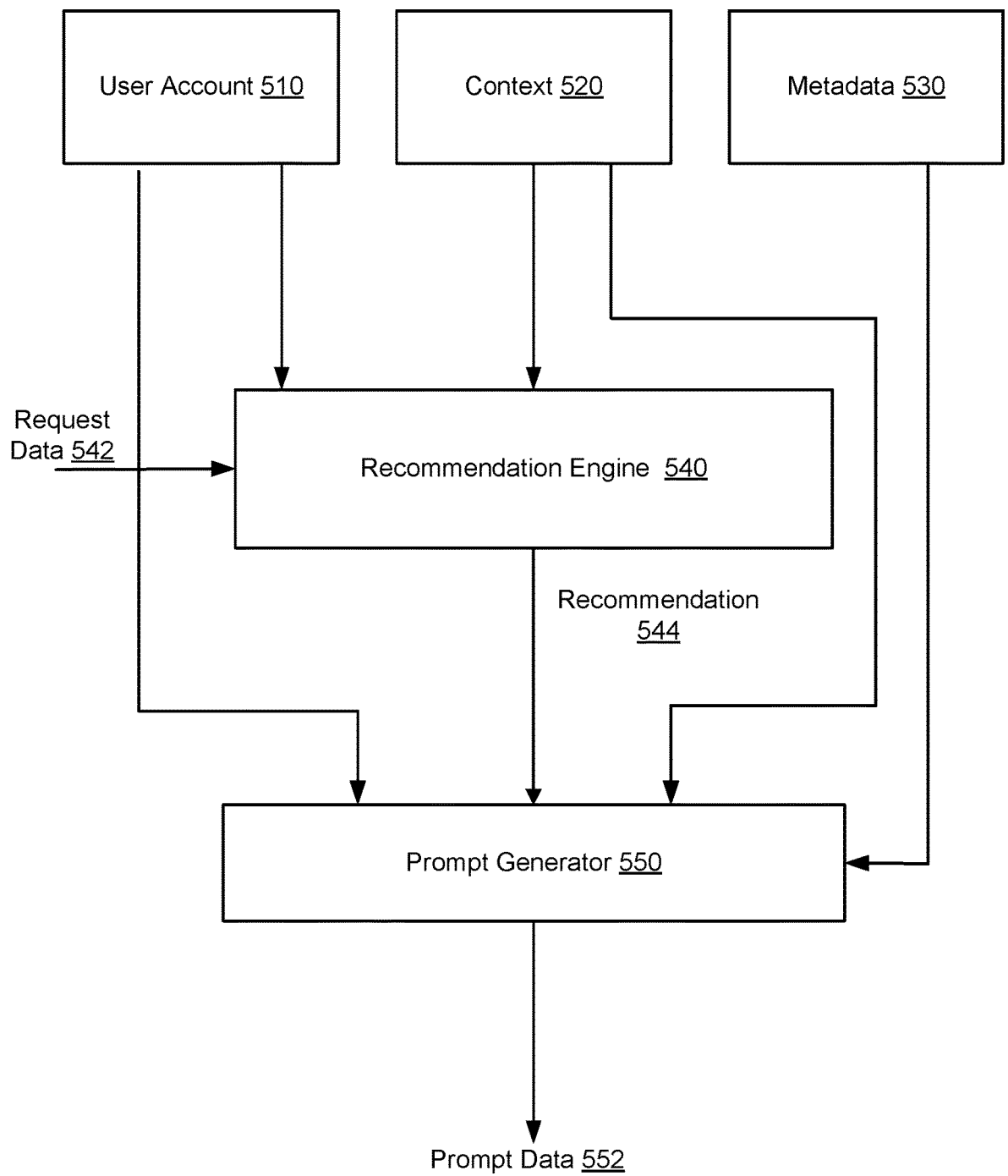
FIG. 5 illustrates an example of components of a system for generating prompt data related to content output, according to embodiments of the present disclosure.

FIG. 5 illustrates an example of components of a computer system for generating prompt data related to content output, according to embodiments of the present disclosure. The components are included in a computer system, such as the computer system 430 in FIG. 4.

In an example, a recommendation engine 540 receives request data 542 for a request, user features associated with a user account 510, and context features associated with a context 520 of the request or a device. The request data 542 corresponds to speech-to-text data of speech input from a user. The user may be determined based on a user identifier (e.g., a user login to a user account associated with a unique identifier of the device and/or a voiceprint). The user account 510 corresponds to the user and includes user features such as content affinities, user preferences, and a history of requests. The context 520 includes features such as a time of day, date, location of the device, and a session. The recommendation engine 540 accesses a data store and determines a recommendation 544 based on the request data 542, the user features, and the context features. For example, based on determining the request data 542 includes a request for music content, the user account 510 indicates the user has a music affinity for pop music, and the context 520 indicates it is raining at the location of the device, the recommendation 544 is a playlist of slow pop music.

In an example, the prompt generator 550 receives data about the recommendation 544 (e.g., an identifier of metadata 530 about the recommendation 544), the user features associated with the user account 510, the context features associated with the context 520, and metadata features associated with the metadata 530. For example, the metadata 530 can include an artist, genre, release date, and era for the recommendation 544. The prompt generator 550 determines prompt data 552 based on these inputs. The prompt data 552 includes customization data and an acknowledgement of the speech input.

In an example, the prompt generator 550 uses weights associated with features of the user account 510, the context 520, and the metadata 530 to determine the prompt data 552. The weights are determined by the recommendation engine 540 and are used by the recommendation engine 540 in generating the recommendation 544. The prompt generator 550 can determine the recommendation 544 includes one or more features with larger weights than other features in the prompt data 552. Unless a customization rule indicates the prompt generator 550 should make the determination based off of other properties (e.g., history if previous prompt data), the prompt generator 550 includes the features with larger weights in the prompt data 552.

The prompt generator 550 may additionally or alternatively use a history of previous prompt data or additional recommendations to determine the prompt data 552. The prompt generator 550 can compare the features of the user account, the context 520, and the metadata 530 to features used in previous prompts to determine which features to exclude from the prompt data 552. Additionally, the prompt generator 550 may receive features of another recommendation for the request from the recommendation engine 540 and determine the features of the recommendation 544 that are not included in features of the other recommendation. The prompt generator 550 can include these features in the prompt data 552 and exclude features of the other recommendation.

In an example, the prompt generator 550 outputs the prompt data 552. The prompt data 552 is output to the device that received the speech input. The prompt data 552 can be text data or audio data to be output by the device. The prompt data 552 is output to the user prior to the content of the recommendation being output.

Figure 6:
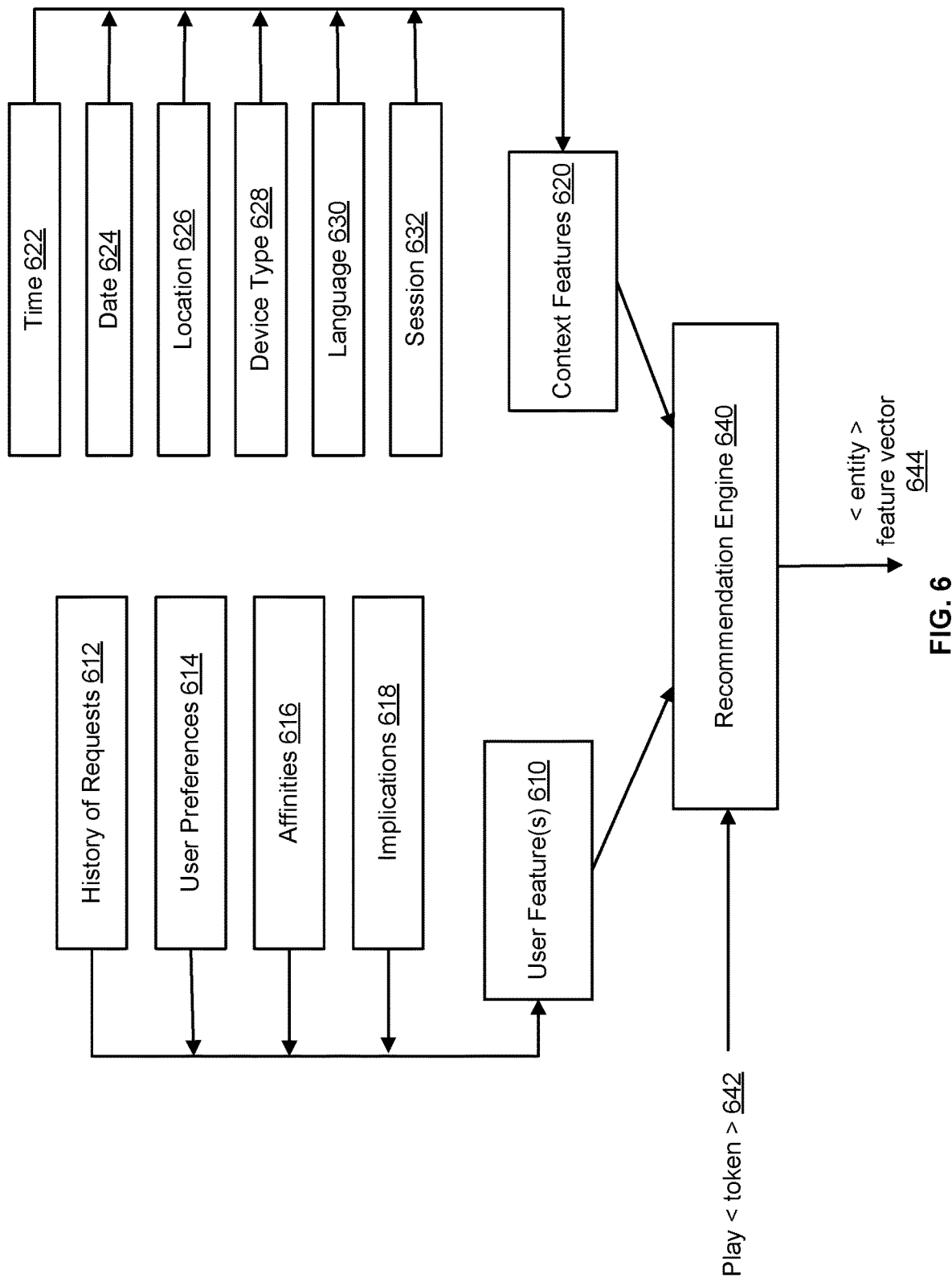
FIG. 6 illustrates an example of a recommendation engine of a system generating a recommendation for content, according to embodiments of the present disclosure.

FIG. 6 illustrates an example of a recommendation engine 640 generating a recommendation for content, according to embodiments of the present disclosure. The recommendation engine 640 is an example of the recommendation engine 450 or the recommendation engine 540. The recommendation engine 640 may be part of a computer system, such as the computer system 430. The recommendation engine 640 can be implemented in hardware or as software code executing on hardware and is described herein next.

In an example, the recommendation engine 640 receives a request 642 which includes a command (e.g., "play") and a token. The request 642 corresponds to speech input from a user at a device communicatively connected to the computer system. As shown in FIG. 6, the request 642 includes a command of "play". The token of the request 642 can include a value associated with the command. In the case of a broad request for music not identifying particular music content, the token may be empty. Otherwise, the token may include an identifier of the particular music content.

In an example, the recommendation engine 640 also receives one or more user features 610. The user features 610 are associated with a user account, where operations of the device can be controlled in part by settings of the user account. The user features 610 can include any of a history of requests 612, user preferences 614, affinities 616, and implications 618. The history of requests 612 can include artists, genres, songs, or other content-related requests previously made by the user. The user preferences 614 can include settings of preferred genres, artists, and the like. The affinities 616 may be determined based on user-created playlists, repeated listening of the user, or the like. The implications 618 can be based on implicit determinations of a user interest. For example, the user "liking" or sharing content can be included in the implication 618.

In an example, the recommendation engine 640 additionally receives one or more context features 620. The context features 620 can correspond to a context of the device or the request 642. For example, the context features 620 can include any of a time 622, a date 624, a location 626, a device type 628, a language 630, and a session 632. The date 624 may be used to make content recommendations corresponding to certain seasons or holidays (e.g., Christmas, Halloween, Easter, etc.). The location 626 can indicate where the device is located (e.g., geographic location such as a street address of global positioning system (GPS) coordinates, and/or space address, such as Kitchen, Living Room, etc.), which may inform the recommendation engine 640 about current weather or contextual information about the location or other location-specific information. The language 630 may indicate to the recommendation engine 640 a language for the content of recommendations (e.g., if the speech input is in Spanish, the content recommendations may also be in Spanish).

In an example, the recommendation engine 640 generates a recommendation 644 based on the request 642, the one or more user features 610, and the one or more context features 620. As shown in FIG. 6, the recommendation 644 can be output as an "<entity> feature vector." The "<entity>" can correspond to the recommended playlist or genre of music. For example, the "<entity>" may be "seventies rock". The feature vector may include the set of the user features 610 and the context features 620 that the recommendation engine 640 used in generating the recommendation 644. For example, the recommendation engine 640 can use user features 610 of affinities 616 for Artist ABC and implications 618 of the user recently "liking" multiple Artist ABC songs and context features 620 of the location 626 having sunny weather and the date 624 corresponding to a Saturday to generate the recommendation 644. As a result, the feature vector of the recommendation 644 may be in the form of "<feature #1><feature #2><feature #3>" with values of "Artist ABC", "sunny", and "Saturday".

Figure 7:
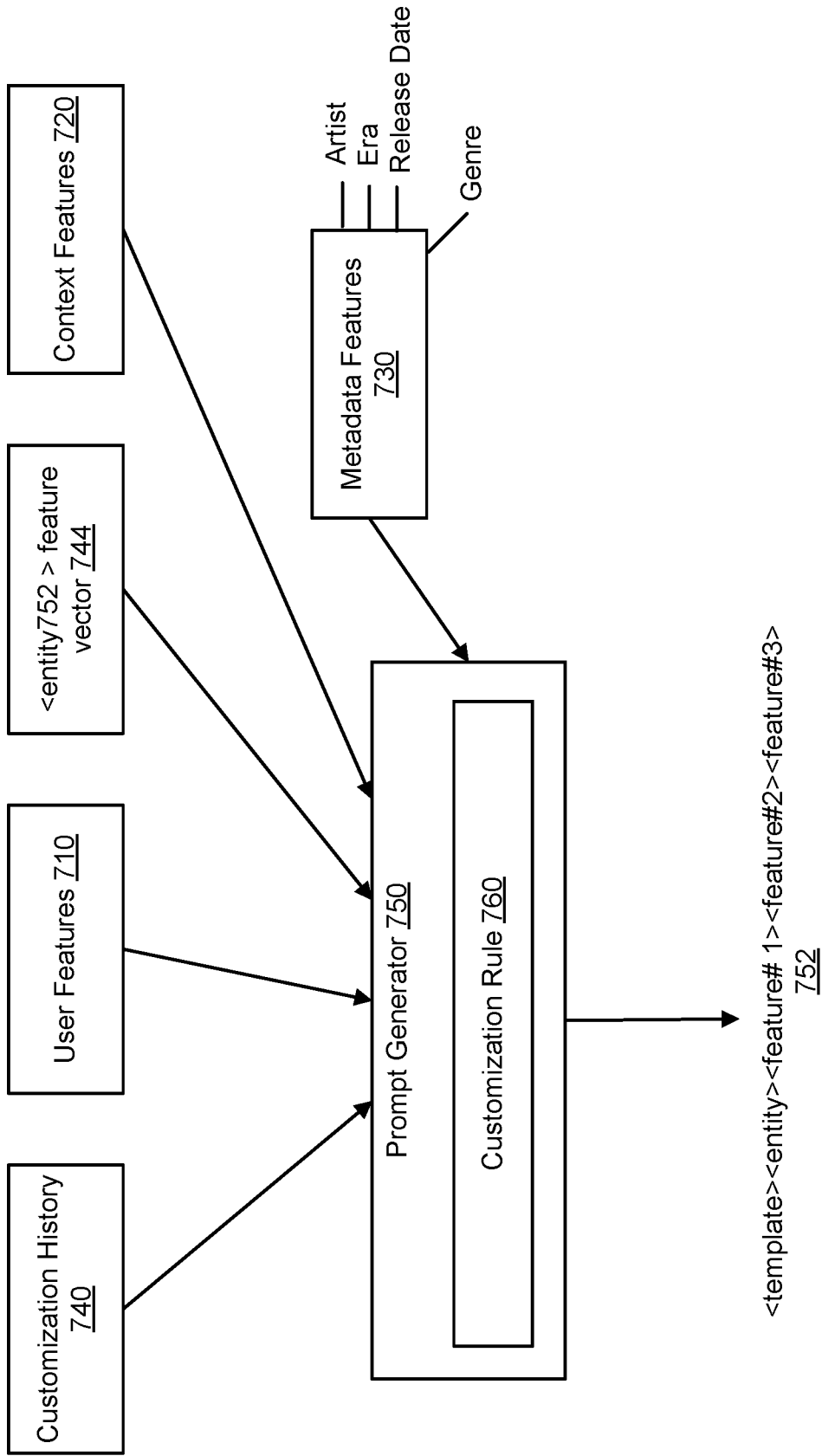
FIG. 7 illustrates an example a prompt generator of a system generating prompt data, according to embodiments of the present disclosure.

FIG. 7 illustrates an example a prompt generator 750 generating prompt data 752, according to embodiments of the present disclosure. The prompt generator 750 is an example of the prompt generator 460 or the prompt generator 550. The prompt generator 750 may be part of a computer system, such as the computer system 430. The prompt generator 750 can be implemented in hardware or as software code executing on hardware and is described herein next.

In an example, the prompt generator 750 generates prompt data 752 (e.g., shown as "<template><entity><feature #1><feature #2><feature #3>") based on user features 710, context features 720, metadata features 730, a customization history 740, and a recommendation 744. The user features 710, context features 720, and metadata features 730 correspond to the features previously described herein. The customization history 740 is a history of previous customization data included in previous prompt data, where the history is stored in the user account and/or in a data store in association with the user account. The prompt generator 750 receives the recommendation 744 from a recommendation engine, such as the recommendation engine 640 in FIG. 6. The recommendation 744 is in the form of an "<entity>" feature vector. The "<entity>" is the recommended content, such as music playlist or station. The feature vector includes the features (e.g., user features, context features) the recommendation engine used to generate the recommendation 744. The recommendation 744 can include one or more recommendations.

In an example, the prompt generator 750 determines the prompt data 752 based on weights associated with the features. The recommendation engine can determine weights associated with each feature and the prompt generator 750 can compare the weights to determine the features to include in the prompt data 752. For example, the prompt generator 750 can include the features with the highest weights in the prompt data 752.

The prompt generator 750 may additionally consider the customization history 740 when comparing the weights. The prompt generator 750 can exclude features of previous prompt data stored in the customization history 740. The prompt generator 750 may apply a decay function to the customization history 740. The decay function can be used to exclude features used in the previous prompt data from the prompt data 752, but can allow features used in the prompt data a predefined number of requests ago (e.g., five) to be included in the prompt data 752. For example, the prompt generator 750 can determine a weight for the user features 710 is larger than a weight for the context features 720. The prompt generator 750 can additionally determine the user features 710 were used in previous prompt data that excluded the context features 720. As a result, the prompt generator 750 includes the context features 720 instead of the user features 710 in the prompt data 752.

In another example, the prompt generator 750 compares feature vectors of multiple recommendations. The prompt generator 750 can receive the top two recommendations and the corresponding feature vectors from the recommendation engine. Comparing the feature vector of the top recommendation 744 to the feature vector of the second recommendation, the prompt generator 750 determines the distinguishing features for the recommendation 744. For example, the feature vector of the top recommendation 744 includes a user preference, a date, and a location and the feature vector of the second recommendation includes a history of user requests, the date, and the location. As a result, the prompt generator 750 determines the user preference is a distinguishing feature for the recommendation 744. The prompt generator 750 includes the user preference in the prompt data 752 based on determining the user preference is the distinguishing feature.

In an example, the prompt generator 750 may additionally include a customization rule 760 for generating the prompt data 752. The customization rule 760 can limit a total number of features that can be included in the prompt data 752. For example, the customization rule 760 can limit the total number of features to two. The prompt generator 750 may include the two features with the largest weights based on the customization rule 760. The customization rule 760 may additionally or alternatively limit a re-use of a feature from previous prompt data. The prompt generator 750 can use the customization history 740 to determine features included in and excluded from previous prompt data.

In an example, the prompt data 752 is output in a format of "<template><entity><feature #1><feature #2><feature #3>". The "<template>" and "<entity>" make up an acknowledgement of speech input. The "<template>" can include predefined data that can be output of at the device and that is a generic acknowledgement "e.g. "Here's". The "<entity>" can identify the recommended content "e.g., "70's rock music." For example, the speech input can be "Alexa, play music". The <template> and <entity> can be "Here's 70's rock music" acknowledging the speech input included a request for music. While the prompt data 752 is shown as including three features, the prompt data 752 can include any number of features. The features correspond to the features the prompt generator 750 determined to include in the prompt data 752. These features are used to customize the prompt data 752. For example, <feature #1><feature #2><feature #3> can correspond to rainy, Monday, morning. As a result, the prompt data 752 in full corresponds to an output of "here's 70's rock music for your rainy Monday morning". The prompt data 752 is output by the prompt generator 750 to a user device where the prompt data 752 is output prior to the recommended content.

Figure 8:
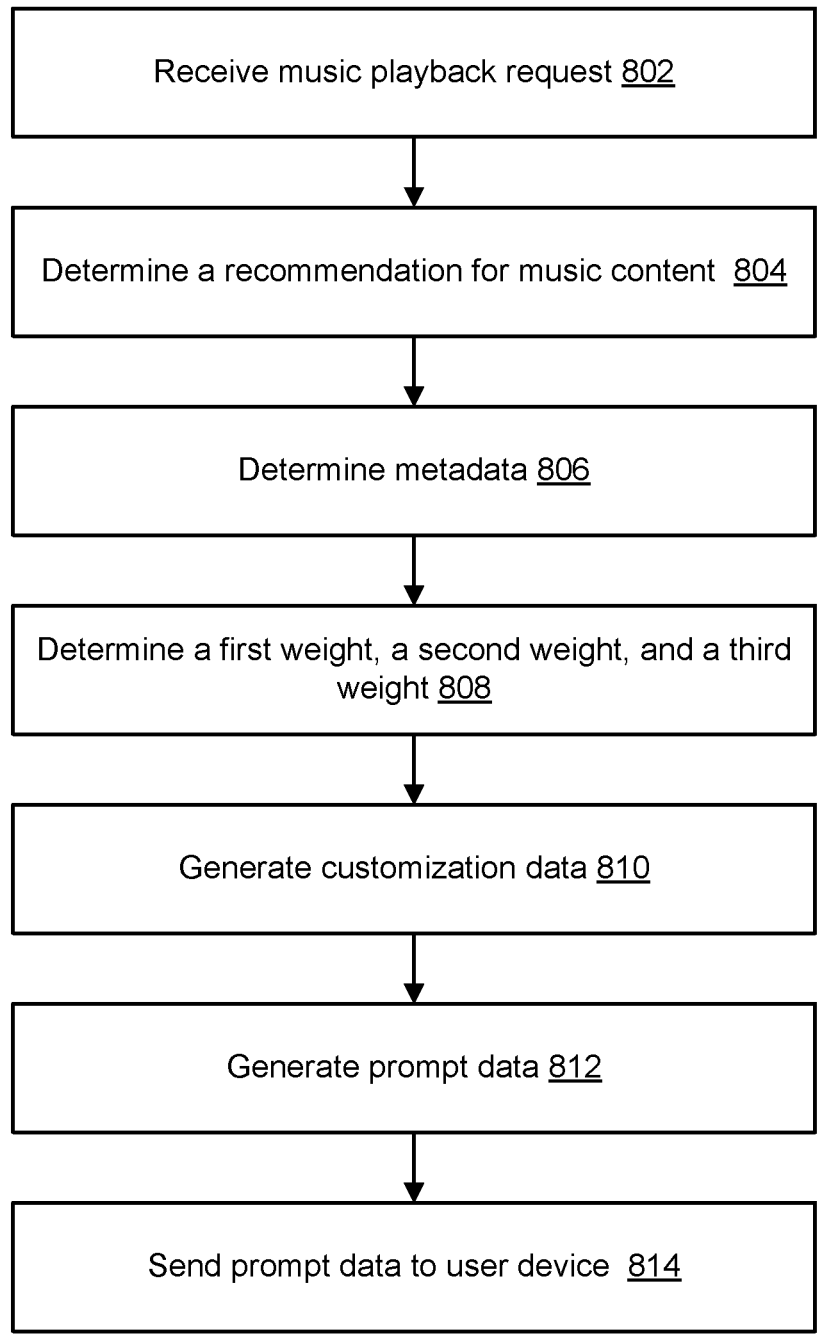
FIG. 8 illustrates an example of a flow for receiving speech input and sending prompt data, according to embodiments of the present disclosure.

FIG. 8 illustrates an example of a flow for receiving speech input and sending prompt data, according to embodiments of the present disclosure. Operations of the flow can be performed by a computer system, such as the computer system 430. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. The operations may be performed using sub-operations of FIG. 9.

In an example, the flow includes operation 802, where the computer system receives a music playback request. The computer system receives the request from a user device as speech-to-text data. The request corresponds to speech input by the user at the user device. As indicated above, other types of request can be received (e.g., for outputting a recipe, or for triggering an activity supported by the user device and/or the computer system). In addition, other types of input modalities are possible (e.g., a GUI element selectable to request content).

In an example, the flow includes operation 804, where the computer system determines a recommendation for music content. A recommendation engine, such as any of the recommendation engine 450, the recommendation engine 540, or the recommendation engine 640, of the computer system determines the recommendation. The computer system determines the recommendation based on context associated with the request and user features for the user. The user features are accessed in a user account associated with the user device. The computer system accesses a data store to determine the recommendation. As indicated above, other types of recommendations can be determined depending on the type of the request (e.g., a recipe recommendation or an activity recommendation).

In an example, the flow includes operation 806, where the computer system determines metadata. The metadata is associated with the music content and is determined from the data store. The metadata can include features, such as any of an artist, genre, release data, or era of the music content. Here also, in the case of other types of request, the metadata can relate to the type of recommendation.

In an example, the flow includes operation 808, where the computer system determines a first weight, a second weight, and a third weight. The computer system determines a first weight associated with a user feature (e.g., user preference, music content affinities, history of requests, implications) of the user account. Additionally, the computer system determines a second weight associated with a context feature (e.g., time, date, location, language of speech input, session). The computer system also determines a third weight associated with a metadata feature of the metadata. The first weight, second weight, and third weight are used by the computer system in generating the recommendation.

In an example, the flow includes operation 810, where the computer system generates customization data. The customization data is generated based on the first weight, the second weight, third weight, and a history of customization data. Features with larger weights may be included in the customization data instead of features with lower weights. Additionally, features used in previous customization data as indicated by the history may be excluded from the customization data. The computer system may determine a customization rule for the customization data. For example, the customization rule may limit the total number of features that can be included in the customization data.

In an example, the flow includes operation 812, where the computer system generates prompt data. The prompt data includes the customization data and an acknowledgement of the speech input. For example, the computer system can generate prompt data for a response of "here's seventies rock for your Friday evening." The acknowledgement is "here's seventies rock," which indicates music content will be output, and the customization data is "for your Friday evening", which indicates context features.

In an example, the flow includes operation 814, where the computer system sends the prompt data to the user device. The prompt data is output by the user device prior to outputting the music content. The prompt data enables the user to receive insight about why the content was chosen for output. In addition, other types of output modalities are possible (e.g., visual representation on a GUI of the user device).

Figure 9:
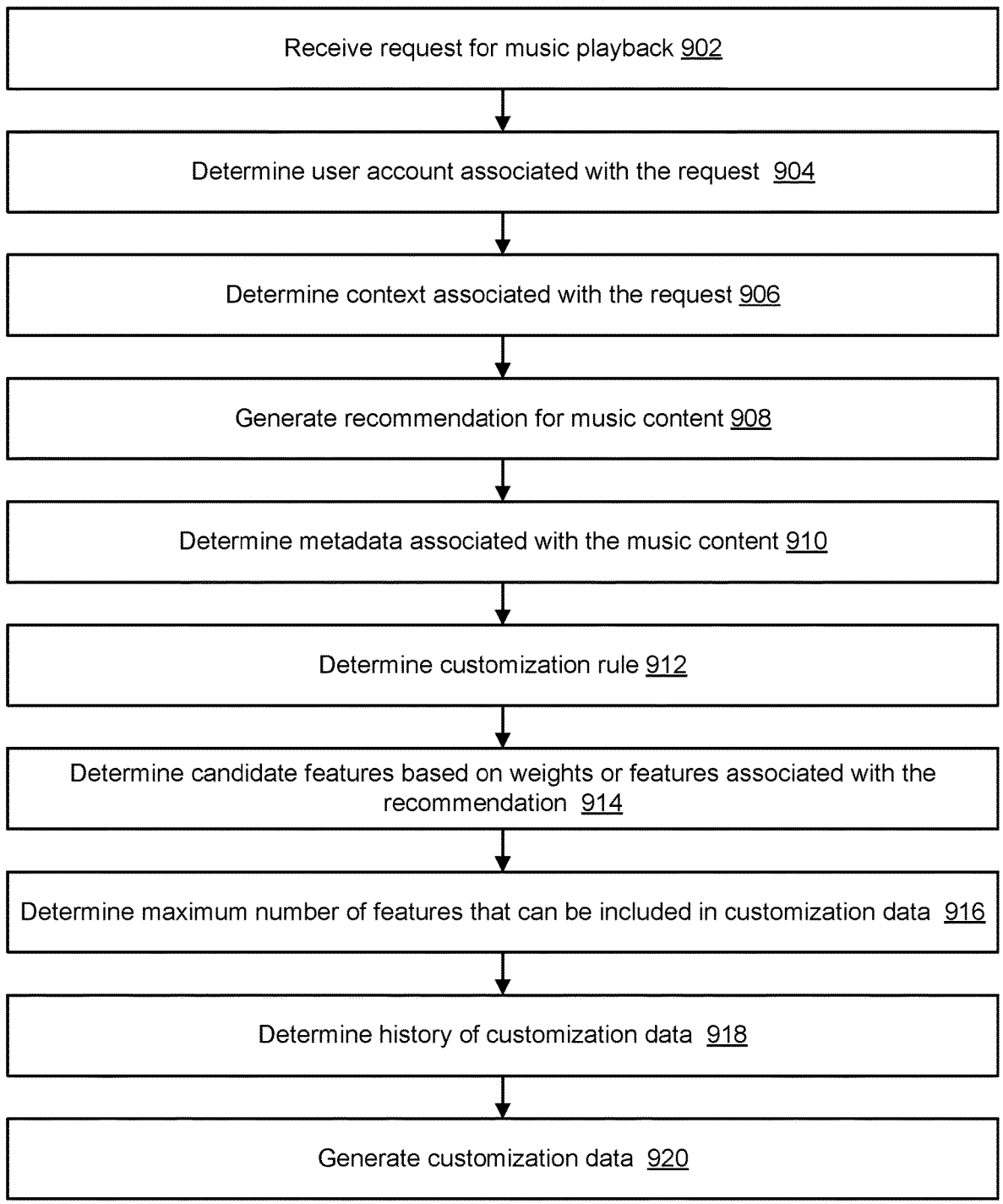
FIG. 9 illustrates another example of a flow for receiving speech input and sending prompt data, according to embodiments of the present disclosure.

FIG. 9 illustrates an example of a flow for receiving speech input and generating customization data, according to embodiments of the present disclosure. Operations of the flow can be performed by a computer system, such as the computer system 430. Some or all of the instructions for performing the operations can be implemented as hardware circuitry and/or stored as computer-readable instructions on a non-transitory computer-readable medium of the sound detector. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. In the flow of FIG. 9, the operations are described in connection with a music recommendation. However, the flow is not limited as such and apply to other types of recommendation depending on the specific speech input and resulting request.

In an example, the flow includes operation 902, where the computer system receives a music playback request. The computer system receives the music playback request as speech-to-text data. The music playback request corresponds to speech input at a microphone of a user device.

In an example, the flow includes operation 904, where the computer system determines a user account associated with the request. In an example, the user device is operational based on a user account (e.g., the user device's identifier is associated with the user account and a user log in to the user account has been authenticated and is applicable). In this example, the user device's identifier may be received with the request and used to determine the user account. In another example, the user device may be associated with a group account that includes multiple user accounts, each of which is associated with a different user identifier (e.g., voiceprint). The computer system determines the user identifier associated with the request (e.g., based on speech processing of audio data corresponding to the speech input, where this processing includes voice printing) to determine the user account associated with the request. In both examples, the computer system determines a user feature from the user account based on the user identifier.

In an example, the flow includes operation 906, where the computer system determines context associated with the request. The context can be associated with a location of the user device. The context may additionally be associated with the request (e.g., time or date of the request).

In an example, the flow includes operation 908, where the computer system generates a recommendation for music content. The recommendation is determined based on the speech-to-text data, the user account associated with the use device, and the context associated with the request. The music content is from a data store or a music source.

In an example, the flow includes operation 910, where the computer system determines metadata associated with the music content. The computer system determines the metadata from the data store.

In an example, the flow includes operation 912, where the computer system determines a customization rule. The customization rule may limit a total number of features that can be included in customization data. The customization rule may additionally or alternatively limit a re-use of a feature from previous prompt data. The previous prompt data is stored in a customization history. The computer system can apply a decay function to determine features to be excluded based on the customization rule.

In an example, the flow includes operation 914, where the computer system determines candidate features based on weights or features associated with the recommendation. The candidate features correspond to features that satisfy the customization rule. The candidate features can also correspond to features that distinguish the recommendation from other recommendations.

In an example, the flow includes operation 916, where the computer system determines a maximum number of features that can be included in the customization data. The maximum number of features may be included in the customization rule. For example, the customization rule may limit the total number of features that can be included in the customization data to two features.

In an example, the flow includes operation 918, where the computer system determines a history of customization data. The history of customization data includes features used in previous prompt data. The computer system may determine to exclude features from the prompt data based on the features being in the history of customization data.

In an example, the flow includes operation 920, where the computer system generates customization data. The customization data includes one or more of the features used in generating the recommendation. The customization data is generated according to the customization rule or based on weights associated with the features. Generally, the computer system includes features with larger weights in the customization data.

Figure 10:
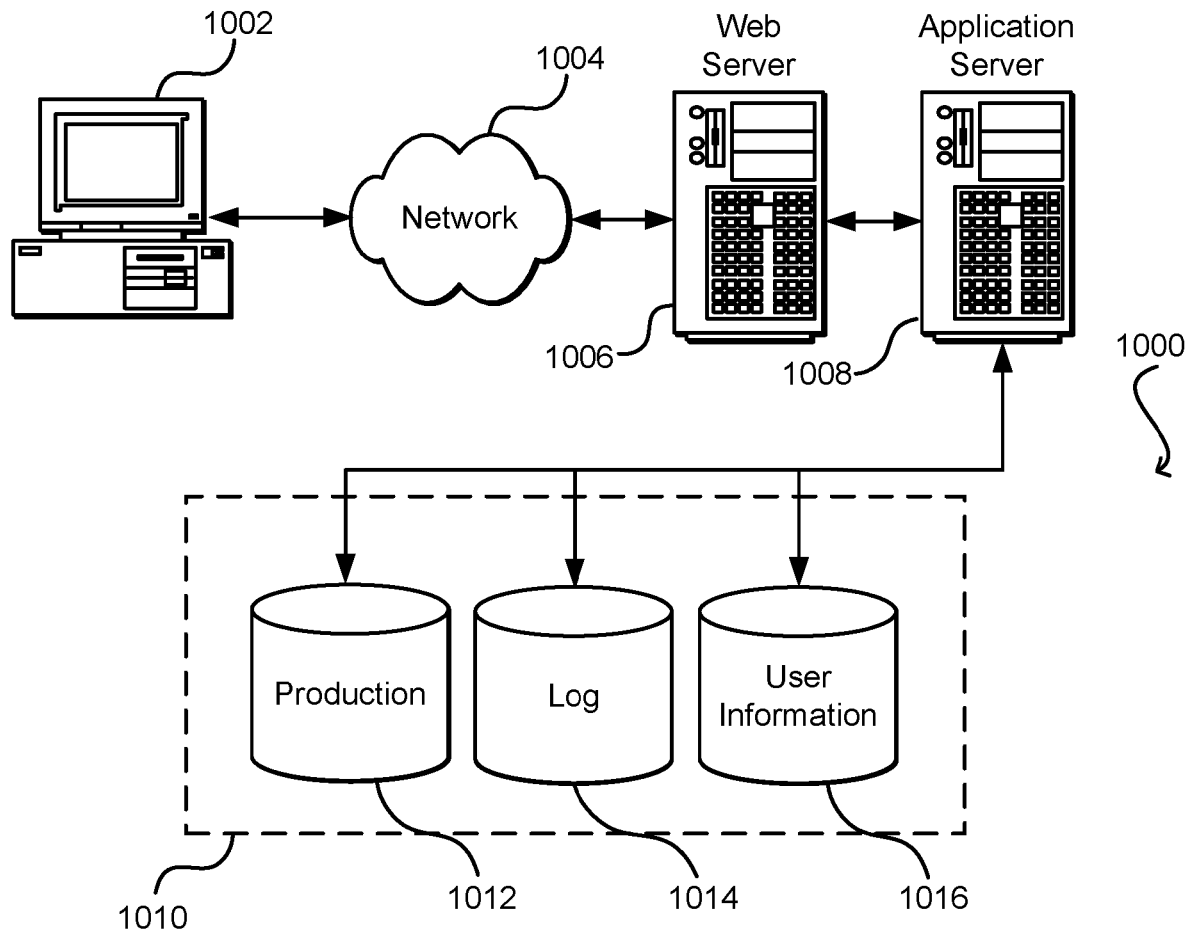
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002 (such as any of the multimedia devices described herein above), which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a system, cause the system to perform operations comprising:
    receiving, from a user device over a data network, first audio data corresponding to a speech input and indicating a request for music playback, the user device associated with a user account;
    generating text data based at least in part on the first audio data;
    determining a value associated with the request based at least in part on the text data;
    determining a user feature of the user account, a context feature of a context of the request, and a metadata feature of metadata of music content;
    determining, from a data store, a recommendation for the music content;
    determining, from the data store, the metadata;
    determining a customization rule that uses a decay function to limit a total number of features that can be included in customization data, the decay function allowing to exclude a first feature used within a number of prompts ago and allowing to include a second feature used outside of the number of prompts ago;
    selecting, based at least in part on the customization rule, a feature from at least one of the user feature, the context feature, or the metadata feature by at least determining that a history of using the feature indicates lack of use of the feature in a most recent prompt;
    generating, based at least in part on the history, the customization data that comprises the feature;
    generating prompt data that comprises an acknowledgement of the speech input and the customization data; and
    sending the prompt data and a command to the user device over the data network, the command causing the user device to generate second audio data from the prompt data and to output the second audio data prior to outputting the music content.

2. The one or more non-transitory computer-readable storage media of claim 1 storing further instructions that, upon execution on the system, cause the system to perform additional operations comprising:
    determining that the user feature was used in previous prompt data and that the previous prompt data excluded the context feature; and
    including, in the customization data, the context feature instead of the user feature.

3. The one or more non-transitory computer-readable storage media of claim 1 storing further instructions that, upon execution on the system, cause the system to perform additional operations comprising:
    receiving, from the user device, a second request for music playback, wherein the second request indicating the value and is generated based at least in part on a second speech input at the user device;
    generating different customization data based at least in part on a history of customization data; and
    sending different prompt data to the user device, the different prompt data comprising the different customization data.

4. The one or more non-transitory computer-readable storage media of claim 1 storing further instructions that, upon execution on the system, cause the system to perform additional operations comprising:
    determining the user feature from the user account, the user feature comprising at least one of: a history of requests, a user preference, or music content affinities;
    determining the context feature based at least in part on the request, the context feature comprising at least one of: a time of day, a date, a location of the user device, a device type, a language of the speech input, or a session; and
    determining the metadata feature from the metadata, the metadata feature comprising at least one of: an artist, an era, a release date, or a genre.

5. The one or more non-transitory computer-readable storage media of claim 1, wherein the recommendation is determined by a first module of the system, wherein the feature is determined by a second module of the system, wherein the second module is separate from the first module and is configured to determine a first weight of the user feature, a second weight of the context feature, and a third weight of the metadata feature used by the first module based at least in part on an interface between the first module and the second module.

6. A computer-implemented method, comprising:
    receiving a request for an output at a user device, the request received based at least in part on first data sent from the user device over a data network;
    determining, from a data store, a recommendation for content based at least in part on the request, a user account, and a context associated with the request;
    determining, from the data store, metadata associated with the content;
    determining a user feature associated with the user account, a context feature associated with the context, and a metadata feature associated with the metadata;
    determining a customization rule that uses a decay function to limit a total number of features that can be included in customization data, the decay function allowing to exclude a first feature used within a number of prompts ago and allowing to include a second feature used outside of the number of prompts ago;

selecting, based at least in part on the customization rule, a feature from at least one of the user feature, the context feature, or the metadata feature;

generating the customization data that indicates the feature;

generating prompt data that comprises the customization data and an acknowledgement associated with the request; and sending the prompt data and a command to the user device over the data network, the command causing the user device to generate the output based at least in part on the prompt data.

7. The computer-implemented method of claim 6, wherein receiving the request comprises received speech-to-text data generated based at least in part on speech input at the user device and indicating a music playback request, wherein determining the recommendation comprises determining music content based at least in part on the speech-to-text data, and wherein the prompt data is output by the user device prior to the music content being output by the user device.

8. The computer-implemented method of claim 6, further comprising:
receiving the first data from the user device, the first data comprising audio data;
generating text data based at least in part on the audio data;
determining a value associated with the request based at least in part on the text data, wherein the recommendation is generated based at least in part on the value, a first weight of the user feature, a second weight of the context feature, and a third weight of the metadata feature.

9. The computer-implemented method of claim 6, further comprising:
determining, from the data store, another recommendation for content based at least in part on the request, the user account, and the context;
determining a first set of features used to generate the recommendation and a second set of features used to generate the other recommendation;
determining that the at least one of the user feature, the context feature, or the metadata feature is included in the first set and excluded from the second set; and
including the at least one of the user feature, the context feature, or the metadata feature in the customization data based at least in part on the at least one of the user feature, the context feature, or the metadata feature being included in the first set.

10. The computer-implemented method of claim 6, further comprising:
determining that previous prompt data excludes the at least one of the user feature, the context feature, or the metadata feature; and
including the at least one of the user feature, the context feature, or the metadata feature in the customization data based at least in part on the customization rule.

11. The computer-implemented method of claim 6, further comprising:
determining a user identifier associated with the request; and
determining the user feature from the user account based at least in part on the user identifier.

12. The computer-implemented method of claim 11, further comprising:
receiving another request for another output;
determining another user identifier associated with the other request;
determining another user feature associated with another user account based at least in part on the other user identifier;
generating different customization data that comprises the other user feature; and
sending different prompt data to the user device, the different prompt data comprising the different customization data.

13. The computer-implemented method of claim 6, further comprising:
determining that the user feature was used in previous prompt data and that the previous prompt data excluded the context feature; and
including, in the customization data, the context feature instead of the user feature.

14. A system comprising:
one or more processors; and
one or more memory storing computer-readable instructions that, upon execution by the one or more processors, configure the system to:
receive a request for an output at a user device, the request received based at least in part on first data sent from the user device over a data network;
determine, from a data store, a recommendation for content based at least in part on the request, a user account, and a context associated with the request;
determine, from the data store, metadata associated with the content;
determine a user feature associated with the user account, a context feature associated with the context, and a metadata feature associated with the metadata;
determine a customization rule that uses a decay function to limit a total number of features that can be included in customization data, the decay function allowing to exclude a first feature used within a number of prompts ago and allowing to include a second feature used outside of the number of prompts ago;
select, based at least in part on the customization rule, a feature from at least one of the user feature, the context feature, or the metadata feature;
generate the customization data that indicates the feature;
generate prompt data that comprises the customization data and an acknowledgement associated with the request; and
send the prompt data and a command to the user device over the data network, the command causing the user device to generate the output based at least in part on the prompt data.

15. The system of claim 14, wherein the recommendation is generated based at least in part on the first data, the user account, and the context, wherein the customization data is generated further based at least in part on the recommendation and the metadata.

16. The system of claim 15, wherein the one or more memory store additional computer-readable instructions that, upon execution by the one or more processors, further configure the system to store, based at least in part on the prompt data being sent, the customization data in a customization data history.

17. The system of claim 16, wherein the customization data is further generated based at least in part on historical data about the customization data history.

18. The system of claim 14, wherein the one or more memory store additional computer-readable instructions that, upon execution by the one or more processors, further configure the system to determine the user feature from the user account, the user feature comprising at least one of: a history of requests, a user preference, or music content affinities.

19. The system of claim 14, wherein the one or more memory store additional computer-readable instructions that, upon execution by the one or more processors, further configure the system to determine the context feature based at least in part on the request, the context feature comprising at least one of: a time of day, a date, a location of the user device, a device type, a language of speech input at the user device, or a session.

20. The system of claim 14, wherein the one or more memory store additional computer-readable instructions that, upon execution by the one or more processors, further configure the system to determine the metadata feature from the metadata, the metadata feature comprising at least one of: an artist, an era, a release date, or a genre.

\* \* \* \* \*